United States Patent [19]

Stermann

[11] 4,284,283
[45] Aug. 18, 1981

[54] EXPANSIBLE CHUCK

[75] Inventor: Vid Stermann, St. Georgen, Fed. Rep. of Germany

[73] Assignee: Tobler S.A. Mecanique de Precision Franco-Suisse, Louvres, France

[21] Appl. No.: 54,629

[22] Filed: Jul. 3, 1979

[30] Foreign Application Priority Data

Jul. 5, 1978 [FR] France .................. 78 19953

[51] Int. Cl.³ .................... B23B 31/02; B23B 31/40
[52] U.S. Cl. ........................ 279/2 R; 82/44;
242/72 R; 269/48.1; 279/1 G; 279/1 Q; 279/9 R; 279/55
[58] Field of Search ........... 279/1 Q, 1 G, 1 N, 1 W, 279/2 R, 9 R, 55; 269/48.1; 242/72 R; 82/44

[56] References Cited

U.S. PATENT DOCUMENTS

| | | | |
|---|---|---|---|
| 2,765,175 | 10/1956 | Parker et al. | 279/1 Q X |
| 2,801,858 | 8/1957 | Spieth | 279/2 R |
| 2,877,022 | 3/1959 | Parker et al. | 279/1 G X |
| 3,089,739 | 5/1963 | Spieth | 279/1 N X |
| 3,093,331 | 6/1963 | Carroll | 242/72 R X |
| 4,016,783 | 8/1978 | Glimpel | 279/2 R |

Primary Examiner—Z. R. Bilinsky
Attorney, Agent, or Firm—Haseltine and Lake

[57] ABSTRACT

A chuck having a plurality of elastic and resilient compressible segments which have the general shape of a strip which, in longitudinal section, have a zig-zag configuration with flattened tops and bottoms, with upper and lower recesses which are filled with an elastomeric material.

10 Claims, 7 Drawing Figures

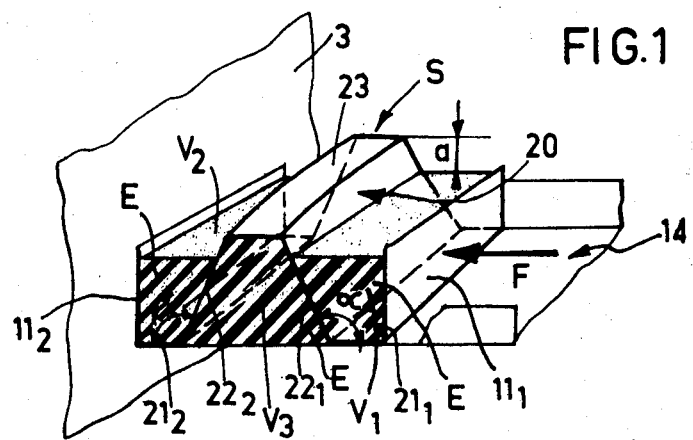
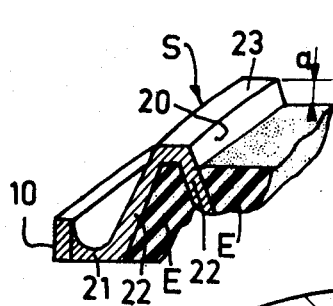
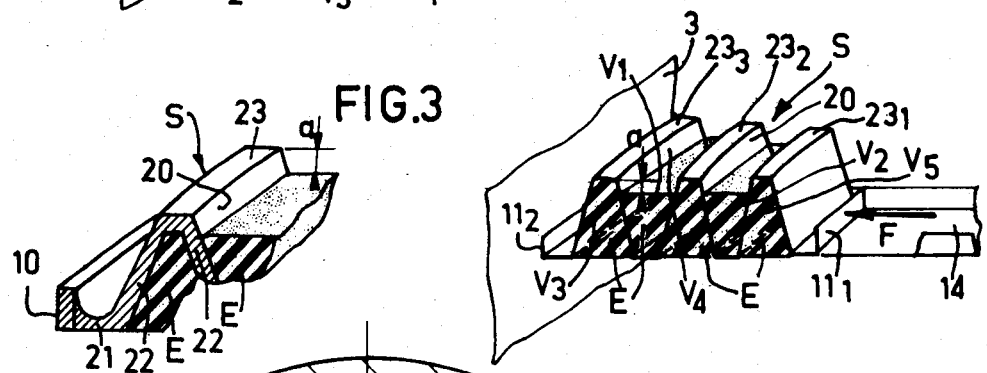
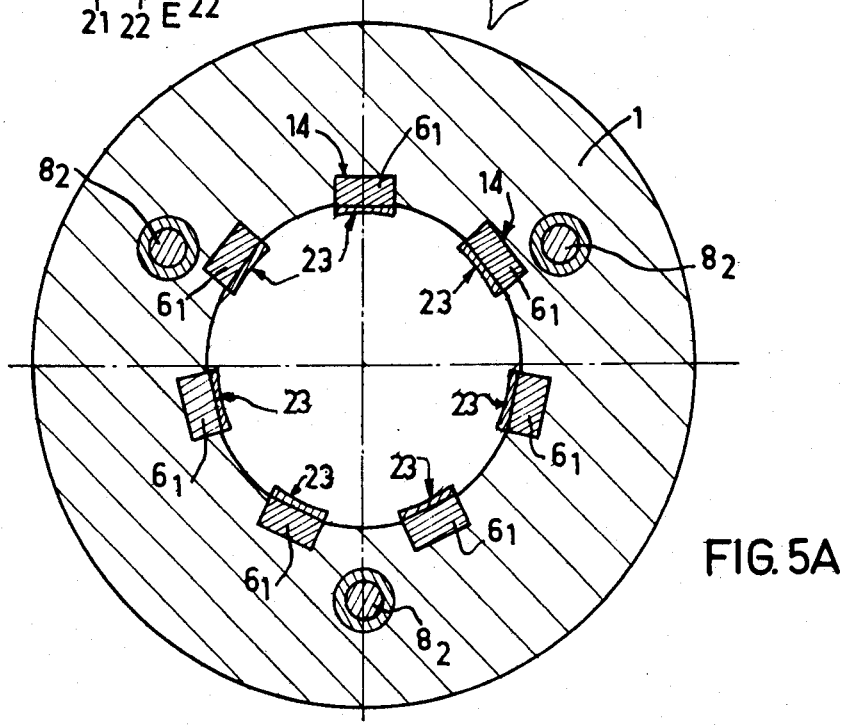

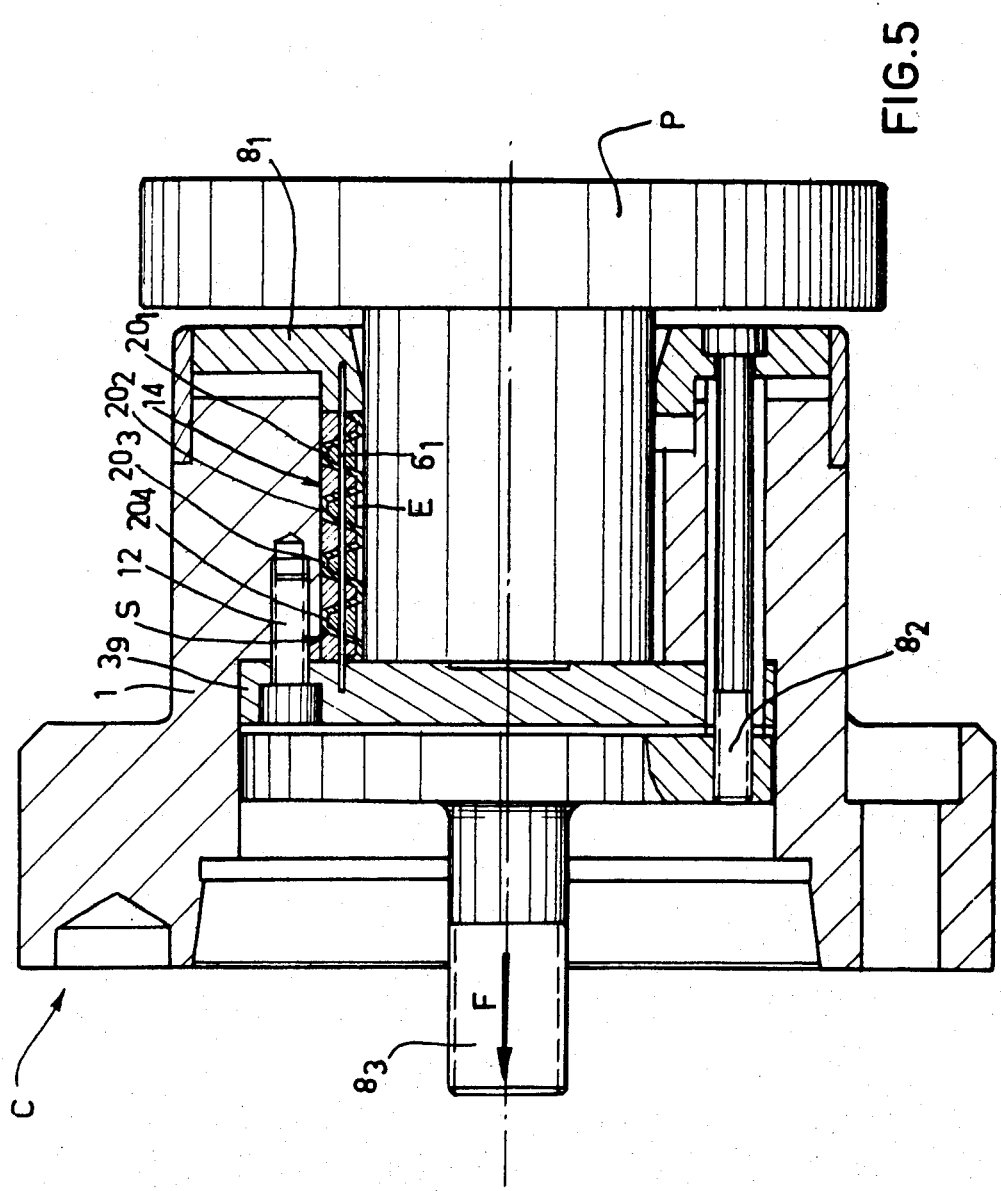

EXPANSIBLE CHUCK

The present invention concerns an expansible chuck comprising resilient and elastic segments, the workpiece to be machined being gripped by compression of said segments.

Chucks are known, wherein the member to be machined is gripped by compression of a cylindrical sleeve comprising upper and lower recesses which are disposed radially around said sleeve. Such chucks suffer from a large number of disadvantages, the most serious of which are as follows: It is virtually impossible to produce sleeves which have strictly constant mechanical characteristics, in each of their parts; this results in a lack of precision in gripping the workpiece to be machined, and the danger of premature cracking or rupture of the sleeve at its weakest point; the recesses suffer from the danger of becoming fouled in the course of operation of the chuck, which results in the possibility that fouling material or turnings may get between the member to be machined and the gripping faces of the sleeve; as the walls which define the recesses in the sleeve are disposed radially, the parts of the sleeve which come into contact with the workpiece to be machined, when the workpiece is gripped, have a tendency to assume a curved configuration, giving rise to irregularities in the gripping action; and the use of cylindrical sleeves makes it impossible to grip workpieces whose gripping surface is non-cylindrical.

The aim of the present invention is to eliminate all these disadvantages.

Briefly, the invention provides a chuck having a plurality of elastic and resilient compressible segments which have the general shape of a strip which, in longitudinal section, have a zig-zag configuration with flattened tops and bottoms, with upper and lower recesses which are filled with an elastomeric material.

More precisely, the expansible chuck according to the invention is essentially characterised in that it comprises a plurality of gripping segments which are disposed in longitudinal grooves formed in the shaft which forms part of the body of the chuck, the number and arrangement thereof providing for the best and most precise possible gripping of the workpiece to be machined; each of the segments is in the form of a strip of a strong, resilient, elastic material and may comprise at each of its ends vertical portions which are in contact with the member for transmitting the gripping force and a member which serves as a counter-abutment respectively, and at least one member for gripping the workpiece to be machined, which is formed at each of its ends by a horizontal portion which is applied against the bottom of the groove in the shaft of the chuck and two rising portions which are inclined one towards the other and which are connected together at the top by a horizontal portion whose upper face is applied firmly against the workpiece to be machined, in the gripping condition of the chuck; the free spaces which are thus formed on respective sides of the strip being at least partially filled with an elastomer material; and means also being provided for holding the segments in their grooves.

In accordance with another feature of the invention, the horizontal portion of the segments is so shaped as to be adapted to the gripping surface of the member to be machined.

In accordance with yet another feature of the invention, the elastomer material is fixed on to the segments by a per se known adhesion process.

The chuck according to the invention has many advantages;

when gripping a member having a circular peripheral surface or bore, the chuck makes it possible to compensate for any slight degree of taper;

the gripping segments may be standardised so that it is possible to use them with shafts (of the chuck) of different diameters;

the number of gripping segments used may be selected in dependence on the workpiece to be gripped and the work to be carried out;

the same chuck can be used for workpieces having gripping faces which are non-circular, for example oval, square or rectangular, hexagonal, etc;

the force for applying the workpiece to be machined against the counter-abutment is comparatively low; and fouling material and/or turnings cannot penetrate into the gripping region and the segments.

Other features and advantages will be apparent from the following description and the drawings referring thereto, which are given by way of non-limiting example.

FIGS. 1 and 2 show diagrammatic perspective views of the segments used in the chucks according to the invention;

FIG. 3 shows a perspective view of a part of a segment such as that used in the chuck in FIG. 4 (and FIG. 4A);

Figure 4A:
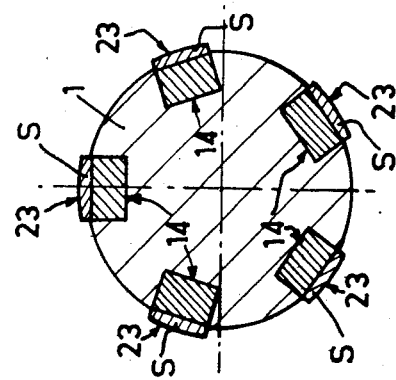
FIG. 4 (and FIG. 4A) show a view in cross-section of an embodiment of a chuck according to the invention for gripping a workpiece by way of the interior, and FIG. 5 (and FIG. 5A) show a view in cross-section of an embodiment of a chuck according to the invention for gripping by way of the exterior.

The segment S shown in FIG. 1 comprises only a single gripping member 20. At each of its ends, the segment S comprises a vertical portion $11_1$, $11_2$. The gripping force F is applied against the portion $11_1$ while the portion $11_2$ bears against the fixed counter-abutment 3. The gripping member 20 proper comprises two horizontal portions $21_1$ and $21_2$ which are fixedly connected to said vertical portions $11_1$ and $11_2$, and two planar portions $22_1$ and $22_2$ which are inclined towards each other and which are connected together at the tops by a horizontal portion 23. As this chuck is to be used for gripping a workpiece by way of the interior of a circular bore (see FIG. 4), the portion 23 is so shaped that its gripping force is applied precisely against the bore when the chuck is in a gripping condition; it therefore assumes the shape of a convex cylindrical rectangle (in the case of gripping a workpiece by way of the exterior, the cylindrical rectangle is concave, as can be seen from FIG. 5). As will be appreciated, it is possible for this horizontal portion 23 to be of any desired shape so as to adapt it to the surface to be gripped on the workpiece P to be machined (not shown in the drawing). Thus for example, the gripping face of the portion 23 may be a flat rectangle for gripping workpieces P with flat gripping faces. The empty spaces $V_1$ and $V_2$ between the vertical portions 11 and the rising portions 22, and the space $V_3$ between the rising portions $22_1$ and $22_2$ are filled with an elastomer material E. This elastomer material is preferably caused to adhere to the portions 11, 21, 22 and 23. For example, the elastomer material used may be rubber which is vulcanised on to said portions, when said portions are of metal. The inclined portions $22_1$ and $22_2$ are at angles $\alpha$ and $\beta$ respectively to the horizontal portions $21_1$ and $21_2$. The angles $\alpha$ and $\beta$ are generally of the same size, and may assume values of from 30° to 150°.

However, if the machining of the workpiece P (not shown) requires it, the angles $\alpha$ and $\beta$ may assume different values in order to produce the best possible distribution of the gripping forces, and it is thus possible further to improve the operation of the chuck, while increasing its service life. It will be appreciated that the dimensioning of the various components of the segment S depends on the nature of the workpiece to be gripped and the work to be carried out. It will also be noted that the elastomer material disposed between the vertical portions 11 and the inclined portions 22 does not reach the height of the gripping member 20. There is a remaining distance a. When assembling the segments for gripping a workpiece by way of the interior thereof, this arrangement, with the distance a, makes it possible to fit at least one segment retaining means in the grooves 14 formed in the body of the crank (see FIG. 4 and FIG. 4A), such as for example an annular spring or the like. The vertical portions 11 of the segment S can be reinforced, if this is found necessary. The material used for producing the strip forming the segment S is generally high-quality spring steel. However, it is possible to use other resilient and elastic materials without thereby departing from the scope of the invention, including non-metallic materials. The gripping force F is applied against the vertical portion $11_1$ of the segment; the other vertical portion $11_2$ at the other end of the segment bears against a fixed abutment 3 of the chuck. The man skilled in the art will immediately recognise the particularly advantageous transmission of the gripping force, due to the shaping of the segment and the presence of the elastomer material, to the portion 23 which is entirely and perfectly regularly raised, when the chuck is gripped on to a workpiece, parallel to the gripping face of the workpiece P, so as to be applied against the workpiece. Before the chuck is tightened on a workpiece, a small operating clearance (not shown) may exist between the portion 23 and the gripping face of the workpiece P to be machined. The segment S may be in the form of a single continuous member or in the form of independent portions which are subsequently connected together. The gripping face of the portion 23 of the segment S may be rough, corrugated, or provided with diamond points or the like.

FIG. 2 shows a segment S comprising three gripping members 20. The vertical end portions $11_1$ and $11_2$ may then be of lower height, as it is sufficient for the elastomer material E to be disposed in the empty spaces $V_1$ and $V_2$ between the members 20 and in the spaces $V_3$, $V_4$ and $V_5$ within the members 20. Preferably, the portions $11_1$ and $11_2$ are then reinforced by a heel or bead portion, as in the embodiment shown in FIG. 3. The operating clearance between the face of the portions 23 and the gripping face of the member P to be machined may exist in respect of all the portions $23_1$, $23_2$ and $23_3$, or in respect of the portion $23_2$ only.

Figure 4:
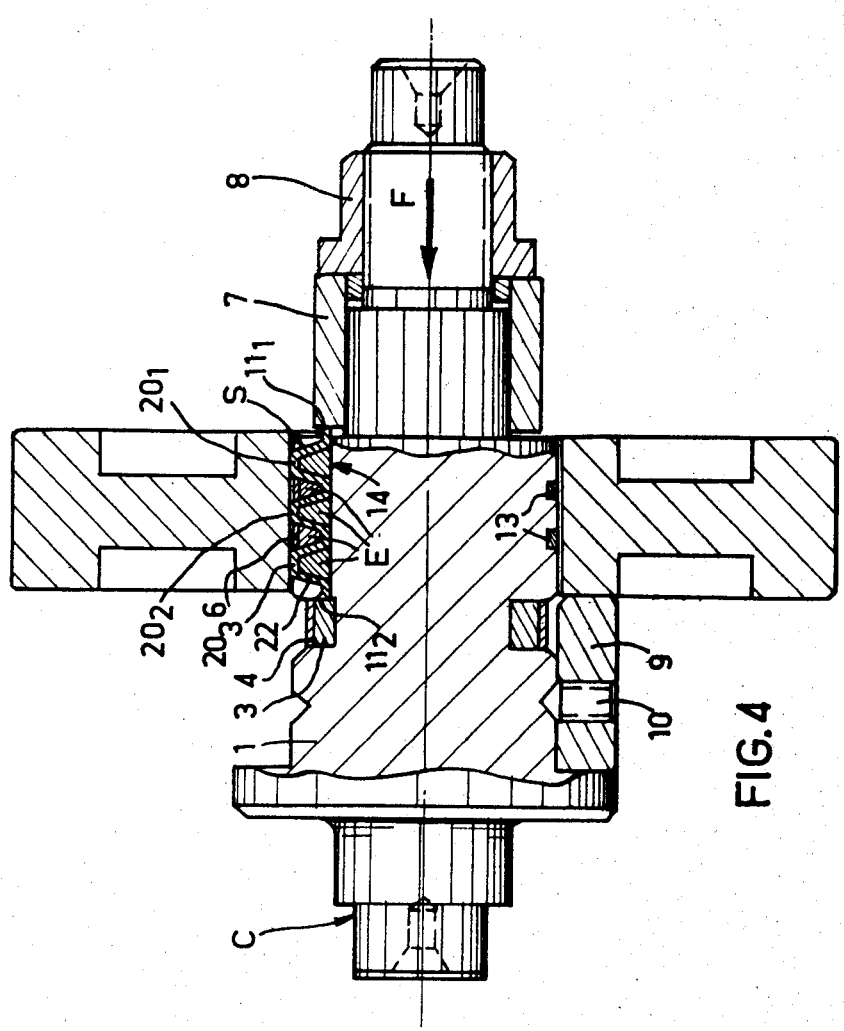

FIGS. 4 and 4A show an embodiment of a chuck according to the invention, which is intended for gripping a workpiece by way of the interior of a circular bore. The body C of the chuck comprises a shaft 1 in which five longitudinal grooves 14 are formed. Five segments S are disposed in the grooves 14. At each of its ends, each segment comprises a reinforced vertical portion $11_1$ and $11_2$ of low height, and three gripping members $20_1$, $20_2$ and $20_3$. The elastomer material is disposed between the rising portions 22 of the members 20 of the segments S, in a manner similar to that shown in FIG. 3. The segments S are retained in the grooves by circular springs 6 which are disposed in suitable manner in the spaces $V_1$ and $V_2$ on the free surfaces of the elastomer material, and in circular grooves 13 formed in the shaft of the chuck 1. A small clearance (not shown) exists, before the chuck is tightened, between the gripping face 23 of the member $20_2$ and the bore of the workpiece P which bears against an abutment 9 for positioning of the workpiece. The abutment 9 is secured to the body of the chuck by means of screws 10. Tightening of the chuck is effected by means of a nut 8 which acts so as uniformly to compress the segments S, by way of a slidable ring 7. The other end $11_2$ of the segments S bears against an abutment formed by a removable ring 3 which is housed in a recess provided in the shaft 1 of the chuck and which is maintained therein by an elastic collar 4. Instead of a nut 8, the chuck may use any other system of tightening the chuck, for example a system comprising a draw rod.

The number of segments used is preferably but not necessarily an uneven number. Thus there are five segments illustrated in the embodiment shown in FIGS. 4 and 4A; there are seven segments in the embodiment shown in FIGS. 5 and 5A which show an embodiment of a chuck according to the invention for gripping a workpiece P to be machined, on the exterior. In this embodiment, seven longitudinal grooves 14 are formed in the bore of the hollow shaft 1 of the body C of the chuck. Seven segments S are housed in the grooves. Each of the segments comprises four gripping members $20_1$, $20_2$, $20_3$ and $20_4$. The elastomer material E is disposed over the whole of the length of each segment S. In this embodiment for example the segments are held in the grooves 14 by means of rods $6_1$ which pass through the segments S substantially half way up each segment, in the longitudinal direction; the ends of the rods $6_1$ which pass through the segments S substantially half way up the segments, in the longitudinal direction, are housed in two removable portions of the chuck, namely in the plate $8_1$ for transmitting the gripping force to the segments S, and the abutment $3_9$ which serves simultaneously as the counter-abutment for the segments S and as an abutment for positioning the member P to be machined. The chuck is actuated by a draw rod-type system comprising the plate for transmitting the gripping force F; the plate $8_1$ is secured to the draw rod $8_3$ by means of the screw $8_2$. The abutment $3_9$ is in the form of a circular plate which is secured in the bore of the shaft 1 of the chuck by means of screws 12. A small operating clearance (not shown) may be provided between the gripping faces 23 of the members $20_2$ and $20_3$ and the workpiece P, before the chuck is tightened on the workpiece. In this embodiment, the gripping faces are concave so that they can be applied totally and precisely against the periphery of the workpiece P when the workpiece P is gripped by the chuck. The mode of actuation of the chuck may be formed by any other system, for example a tightening nut or a hydraulic or pneumatic jack.

When the chuck is gripped on to a workpiece, the elastomer material is compressed and firmly applied against the surface of the workpiece P to be gripped and the bottoms of the grooves 14. This therefore ensures that the segments are preferably sealed off and prevents fouling material and/or turnings from penetrating into the segments during the machining operation.

The chuck according to the invention may be used on any machine tools; it may be mounted between centres on a lathe, on trueing or straightening machines, etc.

It will be noted that the chuck according to the invention makes it possible to achieve a high degree of precision and reliability in operation, and that it provides for centering and truing of the workpiece to be machined, and even truing thin workpieces P, relative to their bore.

A large number of improvements and modifications, in particular from the construction point of view, may be made without thereby departing from the scope of the invention.

I claim:

1. A chuck for gripping and positioning a cylindrical workpiece, comprising:
    a chuck body having a cylindrical surface complimentary to that of a workpiece to be gripped by said chuck and which provides a clearance with a juxtaposed face of said workpiece, said chuck body having multiple grooves extending longitudinally of said cylindrical surface and which are equally spaced circumferentially thereof;
    a radial abutment provided on said chuck body at one axial end of each of said longitudinal grooves;
    an annular member slidably supported on said chuck body for movement axially thereof;
    a radial abutment on said annular member co-extensive with said multiple grooves and positioned adjacent to the other axial end of each of said grooves;
    means for exerting an axial force on said annular member in a direction towards said other end of each of said grooves; and
    an elongate axially-compressible expansion member positioned within each of said grooves, each expansion member comprising an elongate transversely crenelated strip of a spring-steel like material having a radially-extending abutment portion at its respective longitudinal ends, resilient incompressible elastomeric material filling the crenelations on one side of said strip, and resilient incompressible elastomeric material partially filling the crenelations on the side of said strip opposite said one side, said radially extending abutment portions being respectively engaged by said radial abutment of the chuck body and said radial abutment of said slidable annular member, said expansion member expanding in thickness upon the application of an axially directed compressive force thereto by said slidable annular member.

2. The chuck body according to claim 1, in which work contacting surfaces of said crenelations of said strip are of complimentary contour to the contour of said workpiece.

3. The chuck according to claim 1, in which said expansion member, prior to the application of said axially directed compressive force thereto, is of a thickness less than that which would provide engagement of the expansion member with said workpiece.

4. The chuck according to claim 1, in which, under normally encountered compression of said compression member, the volume of said resilient incompressible elastomeric material filling said crenelations on the said opposite side of said strip is insufficient to produce engagement of said elastomeric material with the juxtaposed face of the workpiece.

5. The chuck according to claim 1, in which said crenelated strip is comprised by plural rigidly interconnected sections.

6. The chuck according to claim 1, in which said crenelated strip is comprised by spring steel.

7. The chuck according to claim 1, in which said elastomeric material is comprised by vulcanized rubber.

8. The chuck according to claim 1, in which said chuck includes an uneven number of said longitudinally extending grooves.

9. The chuck according to claim 1, in which the included angle between the portions of said strip comprising said crenelations is between 30 and 150°.

10. The chuck according to claim 1, in which the work-contacting surfaces of said strip are provided with surface irregularities.

* * * * *